United States Patent [19]

Mack et al.

[11] 4,001,690

[45] Jan. 4, 1977

[54] METHOD AND APPARATUS FOR COMPENSATION OF DOPPLER EFFECTS IN SATELLITE COMMUNICATION SYSTEMS

[75] Inventors: Alfred Mack, Cherry Hill; Cameron Charles Schweitzer, Stratford, both of N.J.

[73] Assignee: RCA Corporation, New York, N.Y.

[22] Filed: Aug. 15, 1975

[21] Appl. No.: 605,163

[52] U.S. Cl. .................................. 325/4; 178/69.1; 179/15 BS; 325/58
[51] Int. Cl.² .......................................... H04B 7/19
[58] Field of Search .................. 325/4, 58, 2, 13; 178/69.5 R; 179/15 BS

[56] References Cited

UNITED STATES PATENTS

| 3,320,611 | 5/1967 | Sekimoto et al. | 325/4 |
| 3,428,898 | 2/1969 | Jacobsen et al. | 325/4 |
| 3,676,599 | 7/1972 | Heetman | 179/15 BS |
| 3,787,634 | 1/1974 | Haberle et al. | 325/4 |

Primary Examiner—Robert L. Griffin
Assistant Examiner—Jin F. Ng
Attorney, Agent, or Firm—Edward J. Norton; Joseph D. Lazar

[57] ABSTRACT

A digital system utilizing communication satellite links is arranged to minimize the satellite link transmission time delay variation and achieve bit synchronization of the incoming data to a common bit clock at a central tandem switching or collection center.

The incoming data bit rate from each subsidiary center is monitored by suitable means such as a threshold detector to determine if the time delay rate is changing relative to the tandem center central timing. Each of the lines from every subsidiary center has minimal buffering means in the tandem center to absorb short-term changes in the input data rate. A message selecting and encoding network is provided in the tandem center for each subsidiary center to generate a return bit rate message to its respective subsidiary center. Each subsidiary center is provided with suitable decoders, logic, and an oscillator to change the data bit rate in response to the control message from the tandem center.

8 Claims, 10 Drawing Figures

TANDEM CENTER (16)

Fig_1a_

SUB-CENTER (BLOCKS 12, 13, 14, 15 ETC.)

Fig_2_

_Fig. 6a_ (Nominal)

_Fig. 6b_ (Sub-Center Fast Bit Clock)

_Fig. 6c_ (Sub-Center Slow Bit Clock)

METHOD AND APPARATUS FOR COMPENSATION OF DOPPLER EFFECTS IN SATELLITE COMMUNICATION SYSTEMS

The invention herein described was made in the course of or under a contract or subcontract thereunder with the United States Army.

BACKGROUND OF THE INVENTION

1. Field of the Invention

This invention relates to digital communication systems and more particularly to a means for obtaining bit synchronism for multiple digital time division multiplex signals received at a central switching or collection center from a number of remote subsidiary centers via communication satellite links.

2. Description of the Prior Art

Synchronous communication satellites can be used to link subsidiary centers to central tandem switching centers. For such synchronous communication satellites the perturbations in transmission time delay over the course of a 24 hour period can be of the order of milliseconds. These perturbations are caused by the drift motion of the satellite relative to the ground stations. Such drift motion effects on such perturbations are significant in comparison to a subsidiary center and a central tandem switching center interconnected by terrestial microwave radio links. The perturbations introduced by the transmission media of such terrestial links is in the order of a nanosecond per statute mile. Thus, even such terrestial links which are thousands of miles in length will have symbol duration perturbations in the order of microseconds. These perturbations in the microsecond range can be readily absorbed by elastic buffers of relatively few bits in capacity. For the links using synchronous communication satellites with delay variations in the order of milliseconds, it would be necessary in order to compensate for the delays using conventional techniques, to place elastic buffers having many thousands of bits of capacity at the central tandem switching center. For large tandem centers involving hundreds of incoming lines, elastic buffering can then represent complexity involving significant expense. According to the present invention, means are provided to adjust the bit rates transmitted at the subsidiary centers so that the bit rate received at the central tandem switching center will be held very nearly constant. This is achieved by using relatively smaller bit-capacity elastic buffers at the tandem center as a consequence of the relatively small differences that are manifested from the average bit rate. Thus, synchronization of multiple source TDM (time division multiplex) signals to a common bit clock at the tandem center can be achieved by a system in which sensing for all accesses is placed in the tandem center with relatively simple apparatus in each associated subsidiary center. Accurate synchronization is an essential prerequisite for such functions as digital switching used in time shared signal (multiplexing) processing techniques.

One system for compensating for delay variations due to satellite drift is described in a paper by R. K. Townley and R. C. Davis entitled TDM/TDMA SYNCHRONIZATION which has been published in the IEEE Electronics and Aerospace Systems Convention (EAS-CON) Record 1970, pages 260–265. This system utilizes a buffer located at the earth terminal (ET) to compensate for delay variations. The minimum size of the buffer is indicated to be two bits. The described system, (page 264), however is unduly complex in that the bit clock located at the technical control facility (TCF) is continuously adjusted to maintain the number of bits in the buffer at a nominal value. This continuous adjustment in the control facility (TCF) bit clock requires a high rate of transmission of control signals from the earth terminal (ET) to the control facility (TCF) thereby requiring a large system bandwidth.

SUMMARY OF THE INVENTION

According to the present invention, doppler effects due to satellite drift are compensated for by a communications system in which the receiving station stores the transmitted data in a buffer. The data is read into the buffer at the transmitted rate. The transmitting station is capable of transmitting data at a plurality of controllable transmission rates. Data is read out of the buffer at a fixed rate which is intermediate to the read in rate. The difference between the data read in and read out rates are detected. If the difference is greater than the fixed rate, a first signal is generated for transmission via the satellite to the transmitting station. This signal causes the transmitting station to reduce its rate of transmission. If the difference is less than the fixed rate, a second signal is generated which causes the transmitting station to increase its rate of transmission.

DESCRIPTION OF THE PREFERRED EMBODIMENT

Before proceeding to a description of the method and system of the preferred embodiment of the invention. a description of the perturbations in transmission time delay for a synchronous communication satellite will be given.

Figure 1A:
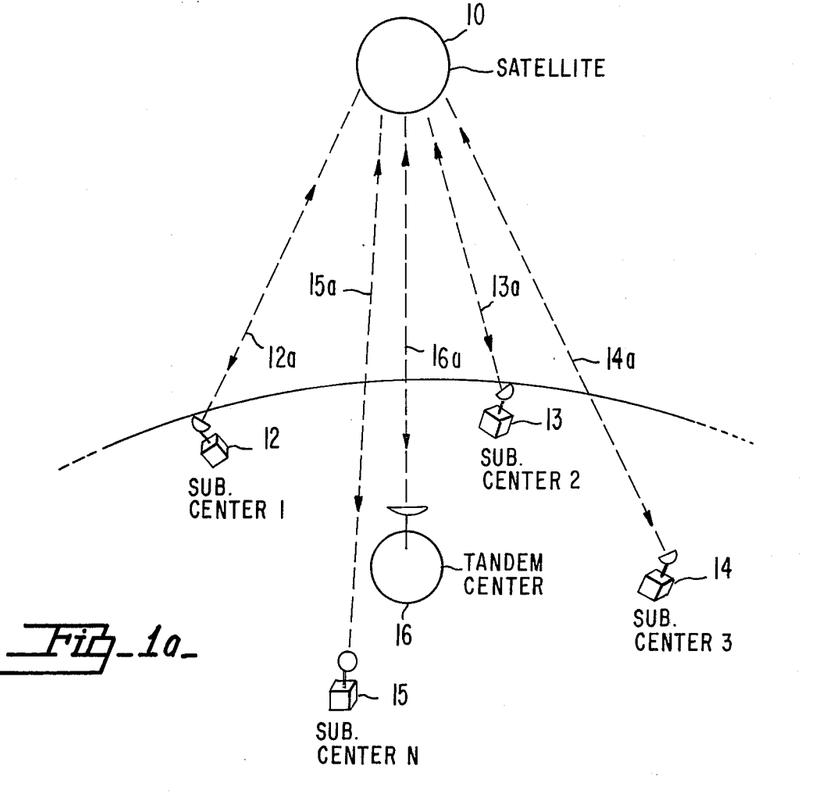
FIG. 1a is a schematic diagram of a conventional satellite communication system in which the present invention may be used.

Referring now to FIG. 1a, there is shown a body 10 which is a synchronous communications satellite in a substantially geo-stationary orbit, typical subsidiary centers including associated ground stations 12, 13, 14, 15 and a central switching center or tandem center 16. This system is characteristic of a so-called star network configuration wherein each subsidiary center 12, 13, 14, and 15 communicates with the tandem center 16 via suitable access means to the common satellite 10. In the star network, each subsidiary center may be considered to be at the end of the spokes of a wheel, the hub of which is the tandem center 16. This configuration thus forms a many pointed star and thus the term "star network." Transmission between the tandem center 16 and the subsidiary centers 12, 13, 14, and 15 is typically accomplished by TDM signals on a common rf carrier. Data is transmitted between a typical subsidiary center 12, 13, 14, and 15 and the central operating facility 16 using the satellite 10 as a link between the two centers via paths 12a–16a, respectively.

Figure 1B:
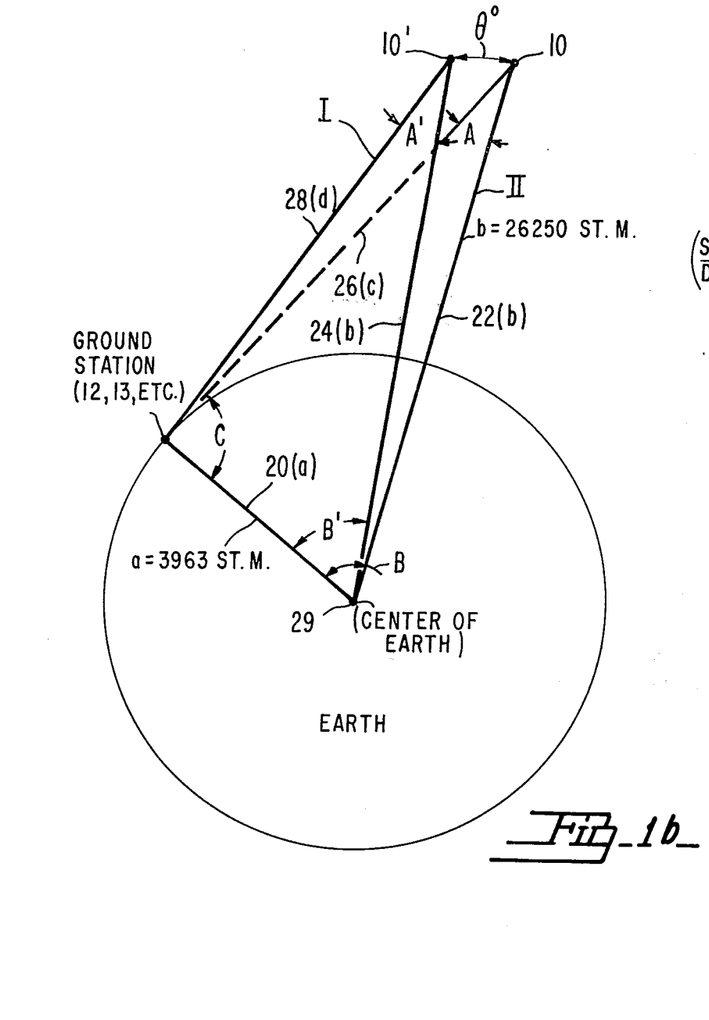
FIG. 1b is a schematic illustrating the geometric aspects relating to the changing inclination of the satellite manifesting the drift motion.

Referring now to FIG. 1b, there is shown a synchronous communications satellite link wherein the synchronous satellite 10 is in an inclined orbit at an initial position. As a result of drift of the satellite 10 from its precise geo-stationary position in the synchronous orbit, in particular, drift in the northerly or southerly direction, often termed north-south drift, the inclination of the satellite relative to the equatorial plane of the geo-synchronous orbit will change. FIG. 1b illustrates drift motion of satellite 10 of $\pm \theta°$ (typically $\pm 3°$) relative to a ground station (12, 13, etc.), the extreme position of the satellite being designated 10'. The drift motion is approximately sinusoidal with a period of 1 day. With no east-west drift during a day the satellite will generate, thus, a seemingly figure eight pattern as seen from the ground station. For a look angle of 5° with respect to the horizon at each ground station, the delay variations in each 24 hour period can be calculated. The look angle is defined as that angle relative to the horizon defining the line of sight or "look" to the satellite. Thus, when the satellite is directly above the ground station, the look angle will be 90°. As the satellite travels away from the 90° (vertical) look angle from the ground station, the look angle decreases. When the satellite appears to be at the horizon, the look angle is either 0° or 180° depending on the referencing direction chosen.

The triangles I, II in FIG. 1b represent the geometry corresponding to the extremes in satellite drift motion. Triangle I is formed by sides (a) 20, (b) 24, and (d) 28, and triangle II is formed by sides (a) 20, (b) 22, and (c) 26. Sides 20 and 24 of triangle I are identical in length to sides 20 and 22 of triangle II. The only and essential difference between the two triangles is that side 28 of triangle I and side 26 of triangle II are not identical in length. Sides 26 and 28 represent the extremes in the slant range to the satellite position from a ground station due to the satellite's drift. Angle C, (typically 95°) between sides 20 and 26 of triangle II represents the look angle of 5° added to the angle of 90° which is defined by side 20 with the horizon at each ground station. Side 20 is a line drawn from each ground station to point 29, the center of the earth. Thus, side 20 represents the mean radius of the earth thus having a value of 3,963 statute miles. Principles of geometry can be used to calculate the total satellite drift in statute miles from triangles I and II. For the typical values assumed in the description of this embodiment, wherein $\theta$ is equal to 6° (the sum of a 3° swing above and below the equatorial plane), range 26 is 25,607 statute miles, range 28 is 25,195 statute miles, and the maximum linear displacement ($R_{max}$) of the satellite from position 10 to position 10' through the angle $\theta$ of 6° is 412 statute miles. This maximum displacement ($R_{max}$) is used to determine the doppler effect. The instantaneous displacement R may be expressed as follows, noting that the displacement is a sinusoidal function:

$$R = \frac{R_{max}}{2} \sin X \qquad (1)$$

wherein X is the period in radians of the displacement. Substituting the values discussed above wherein the time t is in hours relative to the 24 hour period into equation (1) results in:

$$R = \frac{412}{2} \sin \left( \frac{2\pi t}{24} \right) \qquad (2)$$

The maximum time delay ($TD_{max}$) of a signal between a subcenter (12, etc.) and the tandem center (16) caused by the displacement ($R_{max}$) of the satellite is determined from the relation:

$$TD_{max} = \frac{2 R_{max}}{C_o} \qquad (3)$$

where $C_o$ is the speed of light in miles per second. Substituting numerical values:

$$TD_{max} = \frac{2 \times 412}{186 \times 10^3} = 4.43 \text{ milliseconds}$$

This delay of 4.43 milliseconds represents, it should be understood, the maximum delay in the up link and down link paths that will be experienced by a signal as a result of the satellite's drift motion of $\pm 3°$.

The maximum change in frequency due to the doppler effect as a result of the satellite's drift occurs when the rate of change of the displacement R (i.e. the velocity V) is a maximum. The velocity V is the derivative with respect to time of the displacement R and may be determined by the relation:

$$V = \frac{d}{dt}(R) = \frac{d}{dt}\left[ \frac{412}{2} \sin\left( \frac{2\pi t}{24} \right) \right] \qquad (4)$$

Relation (4) when differentiated results in:

$$V = \frac{412}{2} \times \frac{2\pi}{24} \cos \frac{2\pi t}{24} \qquad (5)$$

The maximum value of V, namely $V_{max}$, occurs at $t = 0$ and is calculated as follows:

$$V_{max} = V \Big]_{t=0} = \frac{412}{2} \times \frac{2\pi}{24} = 54 \text{ statute miles per hour} \qquad (6)$$

The doppler shift ($f_d$) may be determined by the relation:

$$f_d = \frac{1}{\lambda} \frac{dR}{dt} = \frac{1}{\lambda} \times 54 \text{ st.m.} \times \cos\left( \frac{2\pi t}{24 \text{ Hrs.}} \right) \qquad (7)$$

where $\lambda$ is the wavelength of the transmitted frequency. at $V_{max}$, the doppler shift ($f_d$) is a maximum. The wavelength of the transmitted frequency is determined as:

$$\lambda = \frac{c_o}{f_t} \qquad (8)$$

where $c_o$ is the speed of light (186,000 statute miles per second) and $f_t$ is the transmitted frequency. For a transmitted frequency of 8 gigahertz, the maximum doppler shift is then:

$$f_{dmax} = f_d \bigg|_{t=0} = \frac{8 \times 10^9 \text{GHz} \times 54 \text{ st.m./hr.}}{186 \times 10^3 \text{ st.m./sec.} \times 3.6} \times 10^3 \frac{\text{secs.}}{\text{hrs.}} \qquad (9)$$

Thus, $f_{dmax} = 645$ Hz.

The maximum rate of change of the doppler shift, which is the maximum of the derivative of the doppler shift can then be determined as:

$$\frac{d}{dt} f_d \bigg]_{max} = \frac{1}{\lambda} \frac{d}{dt} \frac{dR}{dt} \bigg]_{max} = .047 \text{ Hertz/second} \qquad (11)$$

Having determined that for this particular satellite configuration, the maximum two way time delay (TD) will be 4.43 milliseconds, the instantaneous value of the time delay for each link, i.e.

$$\frac{TD}{2},$$

due to the changing inclination of the satellite can then be expressed approximately as:

$$\frac{TD}{2} = \frac{TD \text{ max}}{2} \times \sin 2\pi t/T \qquad (12)$$

where t is 86,400 seconds, the time in seconds equivalent to one day. Thus, it can be seen from above that the time delay varies approximately sinusoidally and will vary between $\pm 2.215 \times 10^{-3}$ seconds, maximum time delay ($TD_{max}$) being 4.43 milliseconds. To compensate for this 4.43 millisecond maximum time delay would, for a typical incoming bit rate of $1.544 \times 10^6$ bits/sec., require an elastic buffer of approximately 6,800 bits capacity at the tandem center for each incoming line.

The rate of change of delay variation of the single-link time delay (i.e.

$$\left( \text{i.e. } \frac{TD}{2} \right)$$

may be determined as the derivative of the delay $$\frac{(TD)}{2}$$

as expressed in equation (12) as follows:

$$\frac{d}{dt} \frac{(TD)}{2} = 2.215 \times 10^{-3} \times \frac{2\pi}{T} \cos (2\pi t/T) \qquad (13)$$

where $t$ equals 86,400 seconds (one day). It can be seen from expression (13) that the rate of change of the single-link delay is a maximum when $t = 0$. Thus, the maximum rate of change of time delay for this embodiment will be $1.611 \times 10^{-7}$ seconds/seconds. For an assumed but typical bit rate of $1.544 \times 10^6$ bits per second, this maximum change in delay per second will be a digital phase shift of approximately one quarter bit per second.

In general, before proceeding with a detailed description of one embodiment, according to the present invention, in order to correct for this maximum rate of phase shift or even for lower phase shift rates, the timing for the multiplexers at the subsidiary centers are preferably controlled by a voltage controlled crystal oscillator (VCXO) located at the subsidiary center (12, 13 . . . ). The VCXO should be capable of generating two frequencies near the chosen bit rate of the system. One frequency is slightly above the tandem center bit clock frequency plus the maximum time delay ($TD_{max}$) and the other output frequency is slightly below the tandem center bit clock frequency minus the same maximum time delay ($TD_{max}$). At the tandem center 16 the incoming signal is written into a five bit elastic buffer. Data is read out of the elastic buffer at nominally two and one half bit intervals after the data has been written into the buffer.

The capacity of the buffer is control to absorb easily any instantaneous or accumulated bit rate changes that can occur over a period of ten seconds. This value of ten seconds as will be better understood from the following more detailed description is selected to anticipate the worst and thus maximum delay variations that will occur including not only those delays due to the doppler shift, but also the inherent delays in the transmission of the order or conrol signals required to implement the invention. Other buffer capacities may be selected as required to meet the system needs.

If the read in bit rate is faster than the read out bit rate, the 5 bit elastic buffer would gradually (in about 2 seconds) be filled to the third bit position. A detector located in the tandem center is arranged to sense the filling of the buffer to the third bit position and to then cause the tandem center 16 to send a message to the subsidiary center (12, 13 . . . ) to lower the subsidiary center's transmission bit rate. The subsidiary center upon receiving this message is provided with means to lower the bit rate to the VCXO frequency which is below the tandem center bit clock frequency minus the time delay ($TD_{max}$). The problem it will be appreciated, is that the subsidiary center transmits information at a faster rate than the tandem center can process that information at that rate due to the changing doppler shift delay through the satellite link. By arranging the subsidiary center to change its bit rate to a lower frequency, information will then be sent to the tandem center at a slower rate to allow the tandem center to empty the 5-bit buffer until eventually only two bits of the elastic buffer located in the tandem center are filled. Under those circumstances, if the bit rate at the subsidiary center were to continue at the lower rate, eventually (after ten seconds) the buffer would empty. In effect, thus the subsidiary center is not transmitting at a rate which is fast enough as compared to the rate at which the tandem center is emptying the buffer. When the tandem center senses that only 2 bits of the elastic buffer are full, a message will be sent to the subsidiary center, ordering the subsidiary center to change its bit rate to that frequency which is slightly above the tandem center bit clock frequency plus the maximum delay variation per second. This sequence of tandem center elastic buffer content expansion and contraction and compensating bit rate change at the subsidiary center will control and effectively maintain the bit synchronism of the incoming signals at the tandem center clock rate.

The choice of a five bit buffer and a 2½ bit interval read out time are based upon the total satellite drift motion in miles and the difference in data bit rates between the subsidiary and tandem center clocks. As explained above the satellite drift motion determines the maximum rate of change of time delay (Expression 13). For a total satellite drift of 6°, this maximum rate of change is $1.611 \times 10^{-7}$ seconds per second. Thus, for an incoming bit rate of $1.544 \times 10^6$ bits per second, the maximum digital phase shift due to drift motion will be approximately ¼ bit per second. The size of the buffer and the bit interval read out time are then chosen to insure than an adequate buffer capacity exists even in the worse case condition to prevent either buffer overflow or underflow. It should be understood that overfilling or underfilling of the elastic buffer can be caused by either of two factors acting alone or in combination. These factors are the difference in bit rates between the subsidiary and tandem center clocks and the changing link time delay due to the drift of the satellite. The effect of worse case phase delay variation due to the satellite and constant transmission delay via the satellite shown in more detail in FIGS 4 and 5 respectively will be described later.

Figure 2:
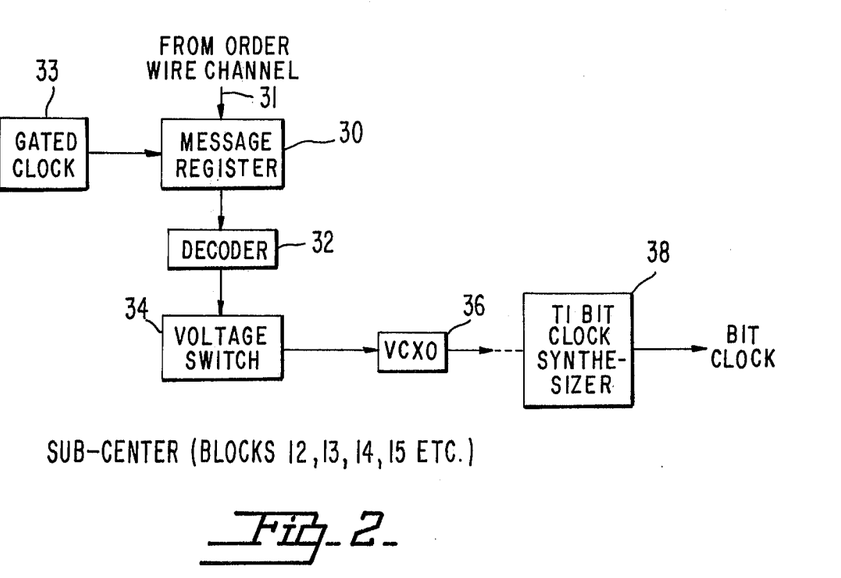
FIG. 2 is a block diagram of the bit timing equipment of a typical subsidiary center embodying the present invention.

Referring now to FIG. 2, there is shown a block diagram of the bit timing equipment according to the invention that is provided at a typical subsidiary center. This equipment generally comprises in combination a message register 30 clocked by a gated clock 33, coupled to a decoder 32, a voltage switch 34 responding to the decoder and functioning to control a voltage controlled crystal oscillator (VCXO) 36, which in turn is coupled to a T1 bit clock synthesizer 38. An identical circuit to that shown in FIG. 2 will be associated with each subsidiary center (12-15) in the star network (FIG. 1a).

Before proceeding to a description of the circuitry of FIG. 2, the type of transmission typically used in a satellite communication link will be described. The information flow to or from the subsidiary center is grouped into so-called "T1 carrier system" groups. This is a type of carrier which has been devised by the Bell Telephone System (A.T.&T. Co.). The T1 system is a 24 channel pulse code modulation (PCM) time division system which utilizes eight bits per channel for a total of 192 bits for the 24 channels. Each grouping of the 24 channels is called a frame. One extra bit for framing purposes is added into each frame so that channel 1 in each group of 24 channels can be located or identified. The purpose of this one framing bit as known in the art is to identify one bit location in the frame so that from this location every channel in the frame can be identified. Thus, there will be 193 bits in a frame. Typically there are 8,000 frames transmitted per second. Thus, the bit rate can be calculated as 193 bits per frame times 8,000 frames per second or $1.544 \times 10^6$ bits per second.

Reverting now to FIG. 2, one of the 24 channels is ordinarily designated as the order wire channel 31. This channel is used to carry various control message between the subsidiary center and the tandem center using the satellite as a link. One portion of the order wire channel is set aside to carry from the tandem center to the subsidiary center the message indicating according to the present invention that the subsidiary center should be transmitting at either the fast or slow bit rate. The simplest form of bit rate message would be a single bit which would either be a logic 0 or a logic 1, with 0, for example, indicating the fast bit rate message. One problem with sending such a simple message is that there is a probability of an error occurring in the transmitted message. For example, a logic 0 could easily be changed by noise occurring during transmission to a logic 1. It is desirable, therefore, to make the system as error proof as possible. Thus, as is well known in the art some form of error encoding will be necessary. This error encoding may take the form of a message comprising more than one information bit with appropriate parity bits added. The parity bits would allow checking of the received message at the subsidiary center to determine if any errors have occurred in transmission. This message indicating the desired bit rate would then be stored in message register 30 suitably gated by clock 33 from the order wire channel 31. The bit size of message register 30, would therefore, depend upon the type of error encoding used in the system.

The decoder 32 of FIG. 2 then decodes the bits contained in message register 30. Decoder 32 may be implemented in a number of suitble logic configurations where the particular form of implementation would be dependent upon the chosen message structure or format. The voltage switch 34 of suitable form is arranged to respond to the contents of the message decoder 32 and generate an output which can be either of two voltage levels. One level indicates that the "fast bit rate" message should be sent from the subsidiary center, while the other level indicates that the "slow bit rate" message should be sent from the subsidiary center.

Voltage switch 34 may be implemented as a flip-flop in combination with an operational amplifier and appropriate gating. When decoder 32 decodes the "fast bit rate" message, the flip-flop thereof functions to set and thus its set side output would be a high. The high output is coupled to the positive input side of the operational amplifier. The output of the operational amplifier suitably coupled to VCXO 36 would then go high, causing the VCXO 36 to generate the fast bit rate output. Similarly, when the "slow bit rate" message is decoded by decoder 32, the flip-flop would reset causing its set side output to go low. The output of the operational amplifier would then go low causing VCXO 36 to generate the slow bit rate output. VCXO 36 is suitably implemented by using any known VCXO which will generate two signal outputs each having a different frequency.

In response to the output of the VCXO, the T1 bit clock synthesizer 38 suitably formed of an analogue to digital converter and a digital divider is arranged to produce the bit clock signal output which is coupled to the transmitting equipment as the modulating signal of the carrier signal. The VCXO 36 output frequency range which will give the desired stability and frequency deviation with the least expense is usually greater than the 1.544 MBPS T1 system data rate. The T1 bit clock synthesizer 38 shown in FIG. 2 is typically formed of digital counters to divide the output frequency of the VCXO 36 down to the T1 system bit clock frequency. Driver circuits, not shown, may also be provided to drive the clock inputs of a number of T1 units as may be required.

Figure 3A:
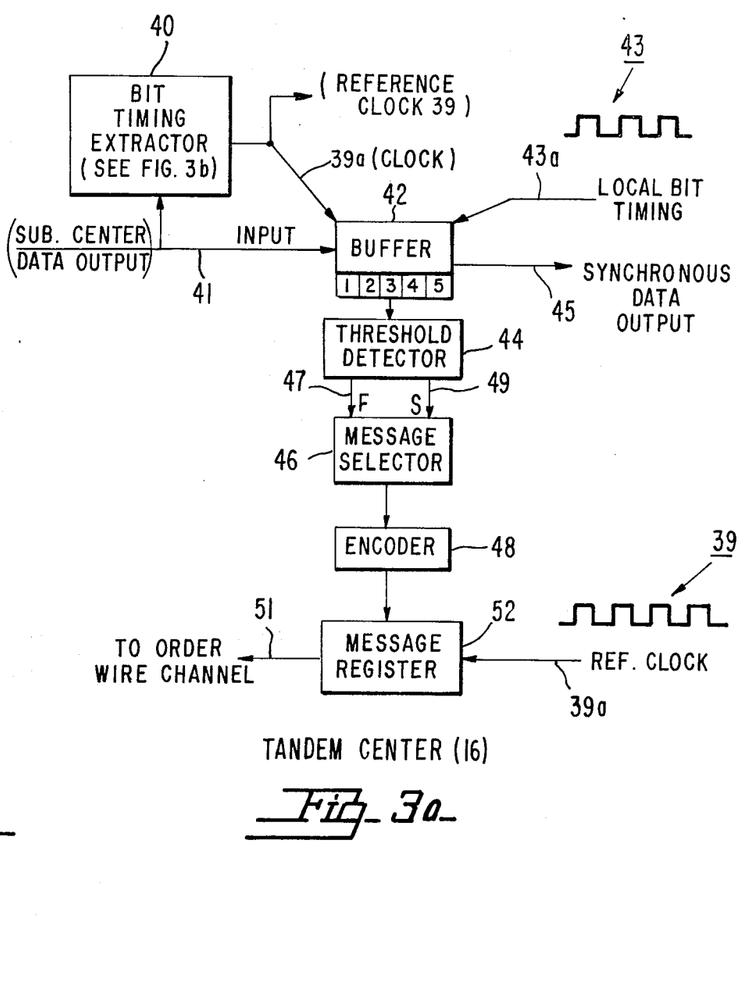
FIGS. 3a and 3b are block diagrams of the bit timing equipment of a typical tandem center embodying the present invention.

Referring now to FIG. 3a, there is shown a block diagram of the bit timing circuit equipment that is provided in accordance with the present invention at the tandem center 16. This equipment to be described in detail typically comprises in combination a bit timing extractor 40, (illustrated in detail in FIG. 3b) a five bit elastic buffer 42, a threshold detector 44, a message selector 46, an encoder 48, and a message register 52. Each incoming line, as input line 41, to the tandem center from a subsidiary center requires its own elastic buffer 42. Thus, the total number of buffers 42 required at the tandem center will depend upon the number of lines from each subsidiary center and the number of subsidiary center. It is necessary, however, to monitor only one buffer (42) per subsidiary center, as timing at a subsidiary center will be established simultaneously for all the lines at that center. Further, satellite drift will, of course, affect all the lines of a subsidiary center equally. It should be understood, thus, that the common effect of satellite drift on the system operation is easily monitored and controlled by merely utilizing the bit timing circuit of FIG. 3a in association with any one of a plurality of input lines 41 and its associated buffer 42 from a particular subcenter such as centers 12, or 13, or 14, etc. The bit rate of the transmitted signal from each subcenter is required to be controlled independently of the other sub-centers, since the time delay is a function of the range of the up and down links between each such sub-center and the tandem center.

Figure 3B:
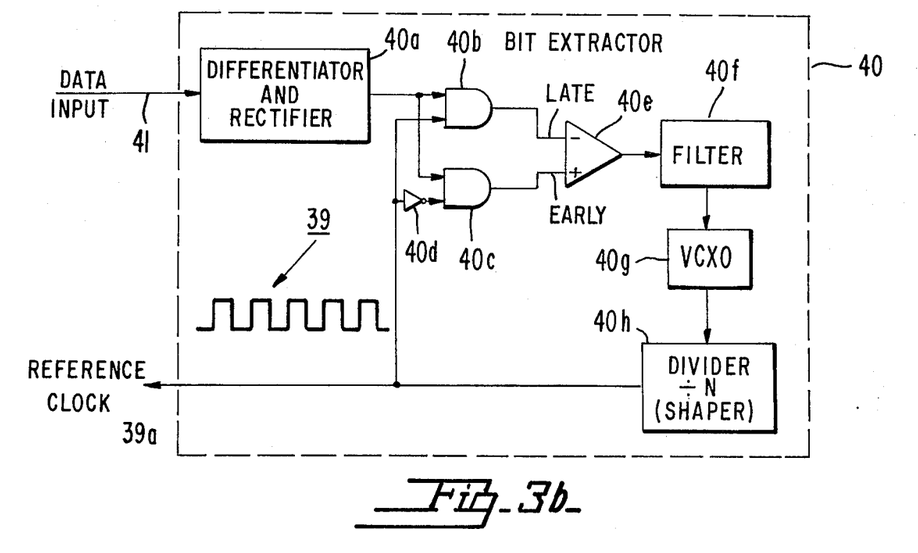

Bit timing extractor 40 may be formed of any known analogue or digital type extractor. A suitable analogue type bit extractor may be formed by use of a phase-locked loop as shown in FIG. 3b. Such a timing extractor 40 comprises generally in combination a differentiator and rectifier 40a, AND gates 40b, 40c, inverter 49d, differential amplifier 40e, low pass filter 40f, VCXO 40g, and divider 40h. Extractor 40 is arranged to generate an output signal, indicated as reference clock signals 39, which will be an exact replica of the bit rate of the data input signal 41.

This output signal 39 is used to clock or gate the input data from the subsidiary center into the buffer 42 (FIG. 3a). As explained previously, the data input rate will be either faster or slower than the tandem center bit clock. Thus, the bit extractor 40 serves to derive a local clock for the tandem center that is synchronized to the clock of the data from the sub center. VCXO 40g, generates a frequency which is an integer multiple, N, of the output frequency of divider 40h. In effect, the combination of VCXO 40g, and divider 40h operates so as to provide an output frequency which is the frequency of the VCXO divided by N. The subsidiary center data transitions are first differentiated and then rectified by element 40a. The transitions therefrom are then compared by AND gates 40b and 40c to the phase of the reference clock signals 39 on path 39a. AND gate 40b determines if the input data transitions are late with respect to reference clock 39 whereas AND gate 40c in combination with inverter 40d determines if the input data transitions are early with respect to reference clock 39. If the input data transitions are late with respect to reference clock 39, this indicates that the reference frequency 39 must be decreased. If the input data transitions are early with respect to reference clock 39 this indicates that the reference frequency must be increased.

The output of AND gate 40b is connected to the negative input of differential amplifier 40e, whereas the output of gate 40c is connected to the positive input of the amplifier. The output voltage of the amplifier 40e is filtered by low pass filter 40f and coupled to the control input of VCXO 40g. the VCXO 40g oscillates at a nominal frequency which can be controlled by the output voltage from amplifier 40e. Depending upon the output voltage of amplifier 40e, the frequency of VCXO 40g will be either increased or decreased about its nominal operating frequency. This change in frequency of VCXO 40g will cause the frequency output of divider 40h to change in the same manner. Divider 40h includes a clipper to shape the ac signals of VCXO 40g into digital, signal waveforms. Thus, the rate of reference clock 39 will either decrease or increase in frequency depending upon whether the input data transitions are either late or early, respectively when compared to the reference clock 39. Specifically, if the input data transitions are determined to be late with respect to reference clock 39, these transitions will be fed by AND gate 40b to the negative input of differential amplifier 40e. The output of differential amplifier 40e causes the frequency of the VCXO 40g to decrease from the nominal frequency. This decreased frequency from VCXO 40g will cause the output frequency of divider 40h, and thus reference clock 39 to increase. Similarly, when it is determined that the data transitions are early with respect to the reference clock 39, the output of differential amplifier 40e will cause the frequency of the VCXO 40g to increase thereby increasing the output frequency of divider 40h. As a result, the reference clock frequency 39 will also increase. In this manner, the reference clock frequency 39 will always be an exact duplicate of the frequency of the data 41. The bandwidth of the phase-locked loop illustrated in FIG. 3b is suitably adjusted to give the desired compromise between lock-up time and noise performance as well known in the art. Since the bit timing extractor 40 is locking on a continuous data stream there is no critical requirement on lock-up time.

The bit timing extractor 40 (FIG. 3a) may also be implemented in a fully digital form. In such a digital implementation, the differential amplifier 40e and low pass filter 40f of the phase lock implementation are replaced by a suitable add/delete circuit.

The digital implementation will generally be more complex than the phase-locked loop implementation shown in FIG. 3b as additional timing controls must be provided for the operation of the add/delete circuit. The phase-locked loop implementation also advantageously has a much smaller power dissipation then the power dissipation of the digital implementation.

The five bit elastic buffer 42 may be implemented in a number of different configurations. Buffers are, in general, memory devices having cells or stages for storing bits of digital data, known as "first in/first out buffers."

Figure 4:
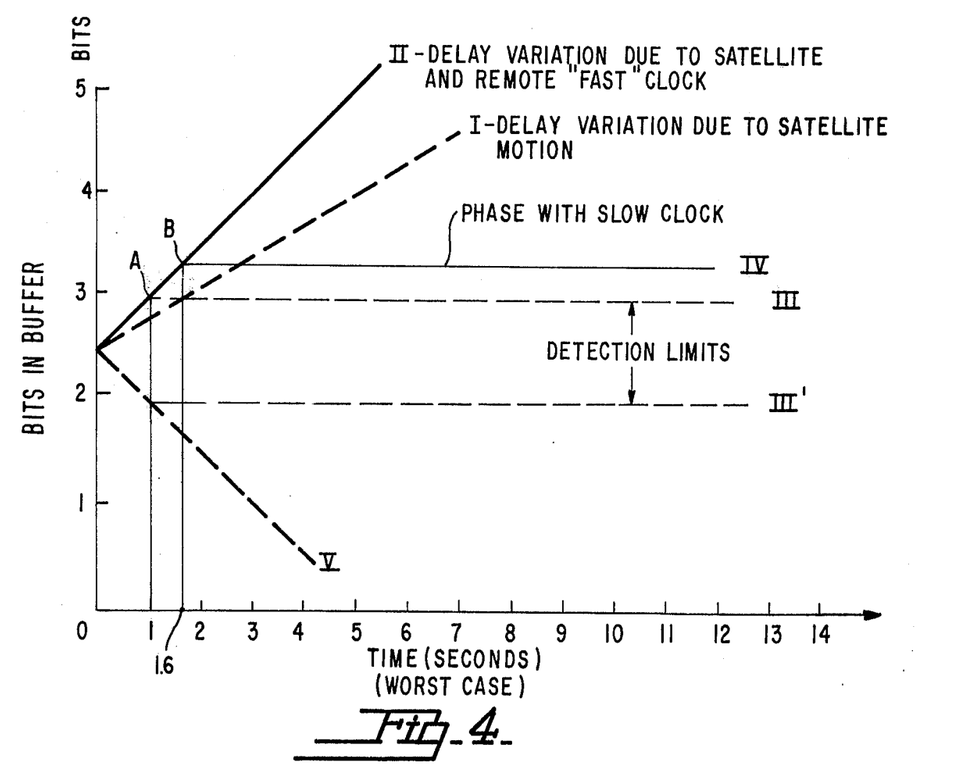
FIGS. 4 and 5 are graphical presentations of the elastic buffer fill state for maximum rate of change of transmission delay and constant transmission delay respectively illustrating the operation of the equipment embodying the present invention.
Figure 5:
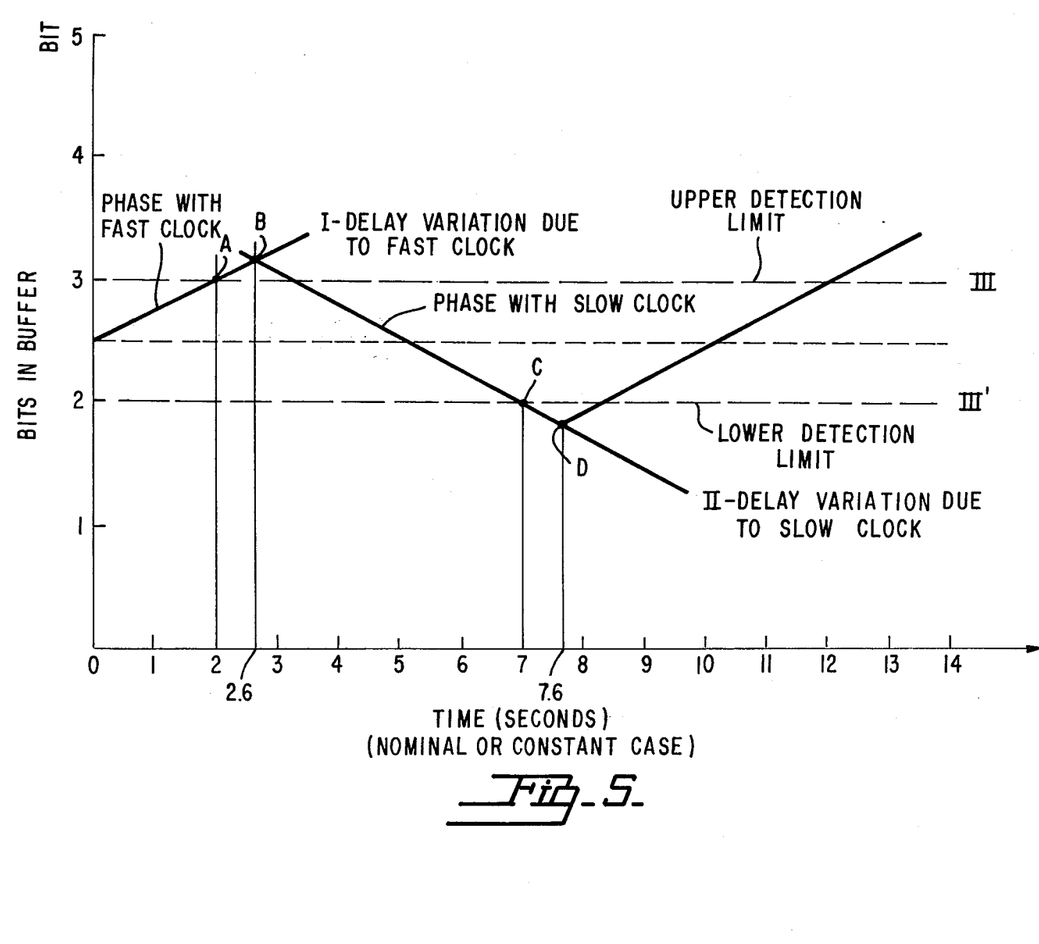

One form of implementation is a buffer by which data is read into one stage and after a predetermined time interval data is read out of another stage. The predetermined time interval between the read-in of data and its read-out would normally correspond to some multiple of a nominal input bit rate. This predetermined time interval allows the buffer to fill to some nominal state before the reading out of data would begin, For example, consider a five stage buffer such as would be used at the tandem center (16). Data would be read into the buffer at the input data rate. Data would nominally be read out of the buffer at a time corresponding to 2 ½ bit intervals after the data has been written in. The time of 2 ** bit intervals has been chosen to allow the maximum margin against buffer overflow or underflow. The data is read out of buffer 42 at the tandem center bit clock rate. The tandem center bit clock indicated as local bit timing signal 43 is generated by an oscillator (not shown) located in the tandem center and is coupled to buffer 42 over path 43a. Thus, the data read out of buffer 42 over path 45 is synchronized to the tandem center bit clock. As explained previously, the drift motion of the satellite will cause the read-in bit rate to change with respect to the read-out bit rate. A difference in bit clock rates between the clocks at the tandem center and the subsidiary center will also cause a change in buffer fill state. These effects of drift motion and different clock rates on the buffer fill state, either alone or in combination, are shown in FIGS. 4 and 5, to be described later.

Table I tabulates the sequence of operation of such an implementation of a five bit buffer for a data read out at 2½ bit intervals after a data read in, for a constant satellite transmission time delay and identical bit clock rates at both the tandem and subsidiary centers.

TABLE I

| BIT INTERVAL | READ IN STAGE | READ OUT STAGE |
|---|---|---|
| 1 | 1 | |
| 2 | 2 | |
| 3 | 3 | |
| | | 1 |
| 4 | 4 | |
| | | 2 |
| 5 | 5 | |
| | | 3 |
| 6 | 1 | |
| | | 4 |
| 7 | 2 | |
| | | 5 |
| 8 | 3 | |
| | | 1 |
| 9 | 4 | |
| | | 2 |
| 10 | 5 | |
| | | 3 |
| 11 | 1 | |
| | | 4 |
| etc. | etc. | etc. |

Thus, it can be seen from the above table that data would nominally be read out of the buffer at 2½ bit intervals after data has been read in, for a constant satellite transmission time delay and identical tandem and subsidiary center bit clock rates. A changing satellite time delay alone or in combination with a difference in bit clock rates at the two centers will cause either buffer underflow or overflow to occur. An alternative form for the elastic buffer is a shift register in which the data is introduced at one end. An intermediate stage of the register at which the data is desired to be read out is used as the nominal output position. For example, this intermediate stage might correspond to the middle of the register. In this way, the register would gradually fill with bits until the middle read-out stage is reached. When the data is coming into the register either faster or slower than it can be read out, the reading out of the data will occur at a stage different from this nominal point. Thus, the register would either overflow or underflow unless the input data rate was changed to reflect this shifting of the actual read out stage from the desired (nominal) read out stage. This shift register form of an elastic buffer is more complex to implement than the "first-in first-out" form previously described.

Figure 6A:
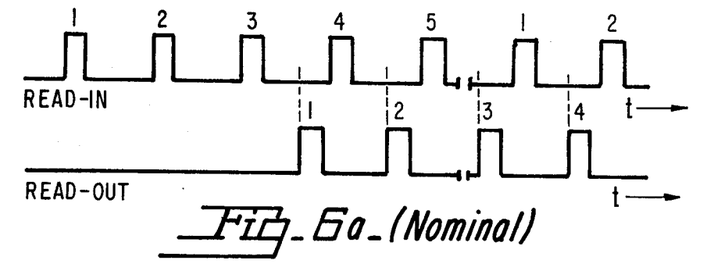
FIGS. 6a, 6b, and 6c show time plots of elastic buffer data read in and data read out for various subsidiary and tandem center bit clock rates illustrating the operation of the equipment embodying the present invention.

Referring now to FIGS. 6a, b, and c, there are shown respectively three sets of waveforms, the upper waveform of each set representing the read-in of data to buffer 42, and the lower waveform representing the read-out of data from the buffer. The individual numbers above each of the pulses in each set of waveforms represent the stage of the buffer 42 (FIG. 3a) to which data is being read into or read out of. For example, the upper waveform of FIG. 6a shows that data is initially read into stage one 1 of buffer 42 then into stage two 2 and so on. The lower waveform of FIG. 6a indicates that data is read first out of buffer stage one 1, then buffer stage two 2 and so on.

The waveforms of FIG. 6a represent the operation of the five bit buffer 42 for a nominal data read out of 2½ bit intervals after a data read in. This nominal condition corresponds to a constant satellite transmission time delay and identical bit clock rates at both the tandem and subsidiary centers. The waveforms of FIG. 6a correspond to the sequence of operation of the buffer which has been tabulated in Table I.

Figure 6B:
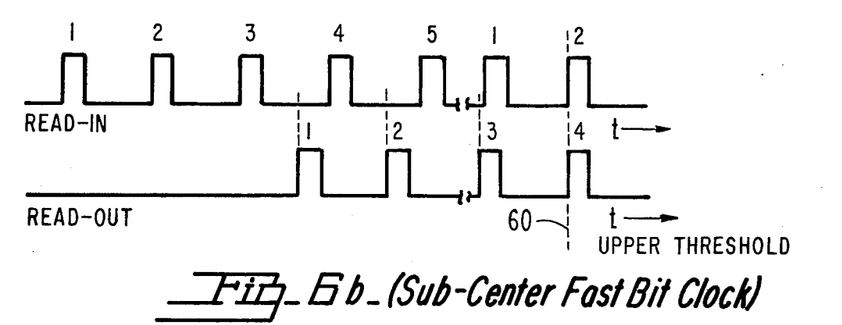

FIG. 6b illustrates the data read in and data read out of buffer 42 for the condition of a constant satellite transmission time delay and a subcenter 12, 13, etc. at a relatively faster bit clock rate (¼ bit per second) as compared to the tandem center 16 bit clock rate. As shown in FIG. 6b it is seen that buffer 42 will fill (relative to the nominal condition) at a rate which depends in this case of constant satellite transmission time delay on the difference between the tandem center and subsidiary center bit clock rates of ¼ bit per second. As buffer 42 fills, the time of occurrence of a read-in relative to a read-out will shift such that after a sufficient period of time (e.g. 2 seconds) buffer 42 will be filled to 3 bits (stages 1, 2, and 3). As can be seen from FIG. 6a for the nominal condition (2½ bit interval read out rate), a read-out of a buffer stage should occur halfway between the time of successive read ins. For example, the read out of buffer stage 4 should occur in time nominally halfway between the read-in of stages 1 and 2. As can be seen in FIG. 6b, the fast bit clock at the subcenter causes buffer 42 to fill such that after a sufficient interval of time (i.e. 2 seconds) the read-out of stage 4 occurs coincident in time with the read in to stage 2. Thus, buffer 42 has filled towards three bit intervals and this overfill condition indicated on FIG. 6b as the upper threshold (reference line 60) is determined by detector 44.

Figure 6C:
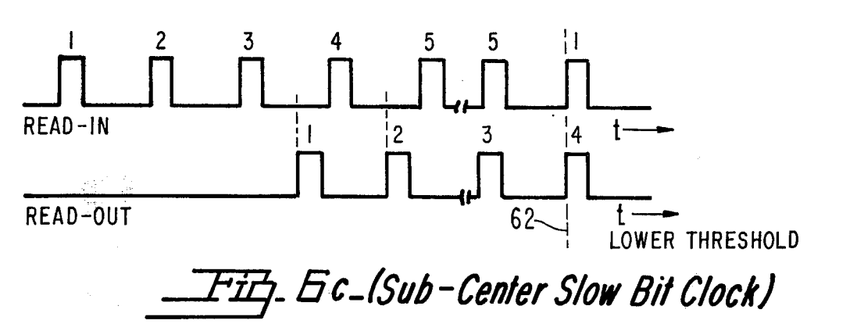

FIG. 6c illustrates the condition of buffer read in and buffer read out for a constant satellite transmission time delay where the subcenter is at the slow bit clock rate (¼ bit per second slower) as compared to the tandem center bit clock rate. For this condition, the buffer will underfill (relative to the nominal condition) at a rate which depends in this case of constant satellite transmission time delay on the difference between the tandem center 16 and subcenter 12, 13, etc. bit clock rates. As the buffer underfills, a condition will be reached at which the read out of stage 4 occurs at the same time as a read in to stage 1. The read out of stage 4 should occur nominally in time (FIG. 6a ) halfway between the read in to stages 1 and 2. Thus, the buffer has underflowed towards two bit intervals between read-out and read-in and this condition indicated on FIGS. 6c as the lower threshold (reference line 62) is determined by detector 44.

The waveforms of FIGS. 6b and 6c illustrate buffer overflow and underflow respectively for a constant satellite transmission time delay. For those portions of the diurnal cycle where the satellite transmission time delay is changing, the rate at which the buffer either fills towards three bit intervals or underflows towards two bit intervals will depend on a combination of the difference in tandem center and subcenter bit clock rates and the rate of change of satellite transmission time delay. It should, however, be understood that determination by detector 44 of buffer 42 underflow or overflow depends only on the time of occurrence of a buffer read-out relative to the time of occurrence of a buffer read-in.

Detector 44 (FIG. 3a) which is used to determine when buffer 42 starts to overflow or underflow relative to the nominal data read-out may be implemented by a multiple stage counter and associated decoding logic. Such a counter is set to a value which corresponds to the nominal read-out of data from buffer 42 at 2½ bit intervals after data has been read in. The counter then, for example, is up counted each time data is read into buffer 42 and down counted each time data is read out of buffer 42. An upper and lower value can then be selected for the count in detector 44 corresponding respectively to the overflowing towards three bit intervals and underfilling towards two bit intervals of buffer 42. Effectively detector 44 establishes an upper or lower limit on the buffer 42 read-out point. Threshold detector 44 is arranged, therefore, through the associated counter / decode logic to generate one of two possible signals, to indicate the respective limits. One signal F, indicating that the buffer in underfilling, the other signal S indicating that the buffer is overflowing are coupled to the message selector 46 over paths 47 and 49. Message selector 46 is formed of suitable logic gates and may comprise two flip-flops as an isolation device between detector 44 and encoder 48. Selector 46 selects either the fast or slow bit rate message to be sent back to the subsidiary center 12, 13, etc. Input signal F indicates that buffer 42 is underfilling. Message selector 46 in response to signal F selects the fast bit rate message to be sent to the subsidiary center. Upon receipt of this message, the subsidiary center changes the output of the VCXO 36 (FIG. 2) to the high bit rate. This change by the subsidiary center to the high data bit rate thus prevents buffer 42 from further underfilling. Similarly upon receiving signal S indicating buffer 42 is overfilling, message selector 46 selects the slow bit rate message for transmission to the subsidiary center. Upon receiving this message, the subsidiary center adjusts the output of VCXO 36 to the slow bit rate which prevents further overfilling of buffer 42. The output of message selector 46 is coupled to an encoder 48 arranged to generate a coded signal of the message to be sent in due time to the subcenters (12, 13, etc.) via a message register 52. Encoder 48 may be any known form for generating a suitable coded output in response to the several possible output signals from selector 46 as will be described.

Message register 52 is arranged to store the coded message from encoder 48 until the system is ready to receive such messages. As explained previously one of the 24 channels constituting a frame is called the order wire channel indicated as path 51 in FIG. 3a. The message stored in register 52 will be transmitted to the subsidiary center from the message register as one or more of the bits comprising the order wire channel. The number of bits in the order wire channel corresponding to the bit rate message depends as known in the art on the type of message coding that is used.

The message mode table (Table II) given below indicates the mode of operation of message selector 46.

Table II

| F | S | Content or Meaning of Desired Message |
|---|---|---|
| 0 | 0 | Last message valid (thus no change in rate required) |
| 0 | 1 | Change to slow bit rate |
| 1 | 0 | Change to fast bit rate |
| 1 | 1 | impossible condition - not used |

From the message mode table it is seen that when the output from detector 44 is the S signal, the slow message is to be sent to the subsidiary center 12, 13, etc. This may be sent as a zero bit with appropriate error coding. When the output of the threshold detector 44 is the F signal, the fast message will be sent to the subsidiary center suitably as a one bit with appropriate error coding. If there is no change in the message to be sent to the subsidiary center as compared to the message that was previously sent, both the fast and slow 47, 49, outputs from the threshold detector 44 will be zeros and the last message will continue to be sent to the subsidiary center. Effectively this indicates that buffer 42 is neither under or overfilling and thus no change is needed in the bit rate clock at the subsidiary center.

The overall operation of the system providing the function of changing the data rate as required due to the condition particularly of satellite drift should be apparent from the above description. The operation of the system in terms of the worst case of transmission delay and the constant (or nominal) transmission delay case will now be described by reference to FIGS. 4 and 5.

Referring now to FIG. 4, there is shown a diagram of the phase of the data relative to the nominal value being written into the elastic buffer versus the time for worst case phase delay variation due to the satellite. Assume the worse rate of change of delay in transmission to be that part of the diurnal satellite cycle when the transmission delay via the satellite is decreasing at the maximum rate as described above from equation (13), namely, $$\Delta T = 1.611 \times 10^{-7} \text{ sec/sec.}$$

This maximum rate of decreasing delay corresponds to a rate of increase of the bit rate each second of $\Delta B_R$ where:

$$\Delta B_R = \Delta T \cdot B_R$$

where $B_R$ equals the bit rate of $1.544 \times 10^6$ bits per second referred to above. Thus, $$\Delta B_R = 0\ 1.611 \times 10^{-7} \text{ sec/sec} \times 1.544 \times 10^6 \text{ bits/sec}$$
$$= 0.25 \text{ bit/sec (¼ bit per second)}$$

Thus, if the bit/rate clock at the subsidiary center is identical to the bit/rate clock at the tandem center, the bit rate of the received signal at the tandem center would be one quarter bit per second faster than the clock at the tandem center. Further, the received digital signal will be read into the elastic buffer 42 (FIG. 3) at a faster rate than it is being read out. Elastic buffer 42 will then fill at the rate of 0.25 bits per second as shown by the dashed characteristic I of FIG. 4. This characteristic represents the delay variation which is due solely to the motion of the satellite. The time scale of the abscissa of FIG. 4 represents the relative times of bit rate status and changes as measured at the tandem center. The ordinate represents the "fill" state of the elastic buffer at the tandem center.

Assume now that the subsidiary center clock is operating at the high bit rate frequency. As explained previously, the high bit rate frequency is one quarter bit per second faster than the tandem center clock frequency. The combined effect of the faster bit rate and the decreasing transmission delay will result in the elastic buffer filling at the rate of ½ bit per second as indicated by characteristic II of FIG. 4. This characteristic represents the combined delay variation effect due to the drift of the satellite and the remote fast clock mode. When the third bit position is filled in buffer 42, the phase detector threshold as explained previously is reached as indicated by point A on characteristic III of FIG. 4. Characteristic III represents the upper detection limit of detector 44. The message selector (46) located in the tandem center will then select the "slow" bit rate clock command and transmit it to the subsidiary center by the order wire channel. Approximately 0.3 seconds later, the command will cause the subsidiary center bit rate clock to shift to the slow bit rate of 0.25 bits per second less than the tandem center bit rate clock. The time delay of 0.3 seconds is based upon the time it will take the command to travel from the tandem center to the subsidiary center via the satellite. The slower bit rate frequency will exactly compensate in this case for the increase in bit rate introduced by the satellite motion and approximately 0.3 seconds after the subsidiary center has shifted to the slower bit rate, a constant (nominal) bit rate received digital signal will be applied to elastic buffer 42. Elastic buffer 42 will then remain at the 3.3 bit fill state as indicated by point B on characteristic IV. Exact compensation for the worst-case decrease at the maximum rate of transmission delay is achieved by setting the subsidiary center bit clock to the slower rate frequency.

It is important to note that in the total reaction time, namely, 0.6 seconds from the original transmission of the change bit rate command to reception of the constant bit rate resulting from the command, the buffer has continued to fill at the rate of 0.5 bits per second. Thus, during the interval of 0.6 seconds buffer 42 will have filled with 0.3 bits as represented by characteristic II. If the constant bit rate is not detected by the tandem center detector 44, 0.6 seconds after the bit rate change command had been transmitted, then the command is repeated (see Table II). Since the unchanged bit rate is filling the buffer at 0.5 bits per second, the two bit interval buffer margin permits the change bit rate command to be repeated between six and seven times before the subsidiary center effects corrective action without having buffer spill over and attendant loss of bit integrity.

Similarly, if the satellite is in that part of its diurnal cycle corresponding to the maximum rate of increase of transmission delay, buffer 42 empties at the rate of 0.5 bits per second if the subsidiary center was in the slow bit rate status. This is represented by characteristic V of FIG. 4 which is the delay variation due to satellite drift and the remote slow clock. Detection limit III' of FIG. 4 results in the command to change to the "fast" bit rate to be transmitted.

FIG. 5 represents the corresponding elastic buffer fill states as a function of time for those portions of the diurnal satellite cycle when the transmission delay via the satellite is essentially constant. Thus, the only change in fill state of the elastic buffer will be due to the difference in bit rates between the bit rate clock at the subsidiary center and the bit rate clock at the tandem center. Characteristic I represents the fill state variation when the received signal at the tandem center is at the fast bit rate whereas as characteristic II applies to the slow bit rate.

Point A on characteristic I represents the time and fill state of the buffer 42 when transmission of a change bit rate command occurs by the tandem center due to the filling of the buffer because of a fast clock rate. Point B represents the time and fill state of the buffer when the received signal at the tandem center first appears with the slow clock rate in response to the change bit rate command issued by the tandem center. Points C and D represent the corresponding change bit rate command and initial response of the received signal when the buffer is emptying because the received signal is at the slow clock rate. The command response cycle time is still 0.6 seconds, as this time depends solely upon the time it takes for the signals to travel between the tandem center and the subsidiary center using the satellite as the link.

FIGS. 4 and 5 and the discussions associated therewith demonstrate the mechanisms by which the invention accomplishes on-line compensation of the variable transmission delays caused by the drift of synchronous satellites in inclined orbits relative to the associated ground stations. FIGS. 4 and 5 referred respectively to the two bounding states of the maximum rate of change and zero rate of change of transmission delay. Since intermediate rates of change are represented by a continuous function of time of the entire diurnal cycle, the invention will adaptively compensate for the transmission time delay variations during the entire diurnal cycle.

The invention was described within the framework of a star network model and a particular multiple access mode of operation. It should be apparent to those skilled in the art that the basic technique of compensation for transmission time delay perturbation based on closed loop control of source bit rate in response to measurement of time delay measurement at the sync end of the satellite link is applicable to other multipoint configurations and other single and multiple access options.

The embodiment of the invention was also described as applied to T1 formatted time division signals. The method for time delay variation compensation is general and transparent to and thus independent of digital time division signal code and format. Other applications and embodiment will be readily apparent in view of the embodiment described within the principles of the invention.

The principles of this invention can be utilized in any of the known satellite communication systems employing time and frequency multiplexing methods of transmission such as time division multiplex (TDM), time division multiple access (TDMA) frequency division multiplex (FDMA), and frequency division multiple access (FDMA) techniques, In general, thus, the invention can be practiced in any environment in which the relative motion of a satellite manifests a variable delay in the transmission of signals to and from ground stations.

What is claimed is:

1. In a system of the type wherein a transmitting station transmits signals to an orbiting satellite relay station to be relayed thereby to a receiving station, wherein said transmitting station is capable of transmitting said signals at a plurality of controllable transmission rates, wherein relative motion between said satellite and said stations causes transmission delays between said stations and said satellite manifesting thereby a read in rate to said receiving station that is different from the transmission rate from said transmitting station, said receiving station comprising:

storage means having at least three storage locations for reading in bits of digital data received from said transmitting station and storing said bits in a predetermined location assignment, each location capable of storing a data bit, means for reading out of said storage means at a fixed rate data bits stored therein in a sequence corresponding to the sequence of receipt of said data bits, said fixed rate being intermediate said plurality of controllable transmission rates, means for detecting a difference in the read in rate and the fixed read out rate of data in said storage means, and generating a first output signal when said difference is greater than said fixed rate and a second output signal when said difference is less than said fixed rate, output means responsive to said first and second output signals of said detector means for generating first and second control signals for transmission via said satellite to said transmitting station, said output means generating said first control signal in response to said detector means first output signal, whereby said first control signal causes said transmitting station to reduce its rate of transmission, said output means generating said second control signal in response to said detector means second output signal, whereby said second control signal causes said transmitting station to increase its rate of transmission, whereby said transmission delays between said transmitting and receiving stations and said satellite are minimized.

2. A system according to claim 1 wherein said plurality of controllable transmission rates is two and wherein said means for reading out of said storage means further includes oscillator means for generating said fixed rate, said fixed rate being one half the difference of said two transmission rates.

3. A system according to claim 1 wherein said output means responsive to said first and second detector output signals further includes:

a. means responsive to said first and second detector output for selecting said first and second control signals, b. means coupled to said selecting means for encoding said selected first and second control signals, and c. means coupled to said encoding means for transmitting said encoded first and second control signals to said transmitting station.

4. A system according to claim 1, wherein said storage means is a buffer having five storage locations.

5. A system according to claim 4 wherein said detector means first and second output signals are generated when the read in to one of said buffer storage locations occurs simultaneously with the read out of another of said storage locations, said first output signal being generated when said read out location is separated from said read in location by one of said buffer storage locations, said second output signal being generated when said read out location is separated from said read in location by two of said buffer storage locations.

6. In a system of the type wherein a transmitting station transmits data signals to an orbiting satellite relay station to be relayed thereby to a receiving station, wherein said transmitting station is capable of transmitting said signals at a plurality of controllable transmission rates, wherein relative motion between said satellite and said stations causes transmission delays between said stations and said satellite manifesting thereby a read in rate to said receiving station that is different from the transmission rate from said transmitting station, said receiving station comprising:

storage means having at least three storage locations for reading in bits of digital data received from said transmitting station and storing said bits in a predetermined location assignment, each location capable of storing a data bit, means for reading out of said storage means at a fixed rate, data bits stored therein in a sequence corresponding to the sequence of receipt of said data bits, said fixed rate being intermediate said plurality of controllable transmission rates, means for detecting a difference in the read in rate and the fixed read out rate of data in said storage means, and generating a first output signal when said difference is greater than said fixed rate and a second output signal when said difference is less than said fixed rate, first output means responsive to said first and second output signals of said detector means for generating first and second control signals for transmission via said satellite to said transmitting station, said first output means generating said first control signal in response to said detector means first output signal, said first output means generating said second control signal in response to said detector means second output signal, said transmitting station comprising:

receiving means responsive to said first and second control signals transmitted via said satellite from said receiving station for storing and generating first and second decoder signals, said decoder signals manifesting a commond for altering the rate of transmission of signals from said transmitting station, second output means responsive to said first and second decoder signals for generating first and second transmission rate signals to alter the rate of transmission of signals from said transmitting station to said receiving station via said satellite in accordance with said command.

7. A system according to claim 6 wherein said transmitter output means further includes:

oscillator means for generating said first and second transmission rate signals, said first transmission rate signal being equal to said fixed rate minus the maximum amount of said transmission delay, said second transmission rate signal being equal to said fixed rate plus the maximum amount of said transmission delay.

8. In a system of the type wherein a transmitting station transmits signals to an orbiting satellite relay station to be relayed thereby to a receiving station said receiving station including storage means having at least three storage locations each location capable of storing a data bit, wherein said transmitting station is capable of transmitting said signals at a plurality of controllable transmission rates, wherein relative motion between said satellite and said stations causes transmission delays between said stations and said satellite manifesting thereby a read in rate to said receiving station that is different from the transmission rate from said transmitting station, a method for minimizing said transmission delays comprising the steps of:

a. reading in at said receiving station bits of digital data received from said transmitting station, b. storing said bits in a predetermined location assignment, c. reading out said stored data at a fixed rate said read out sequence corresponding to the sequence of receipt of said data bits, said fixed rate being intermediate said plurality of controllable transmission rates, d. detecting a difference between said read in rate and the fixed read out rate, e. generating a first output signal when said difference is greater than said fixed rate, f. generating at said receiving station a first control signal in response to said first output signal, g. transmitting said first control signal to said transmitting station, h. reducing said rate of transmission of said transmitting station in response to said first control signal, i. generating a second output signal when said difference is less than said fixed rate, j. generating at said receiving station a second control signal in response to said second output signal, k. transmitting said second control signal to said transmitting station, l. increasing said rate of transmission of said transmitting station in response to said second control signal.

* * * * *